July 29, 1941.                O. BRUMMER                2,251,219
                              FLUID SEAL
                          Filed March 8, 1941
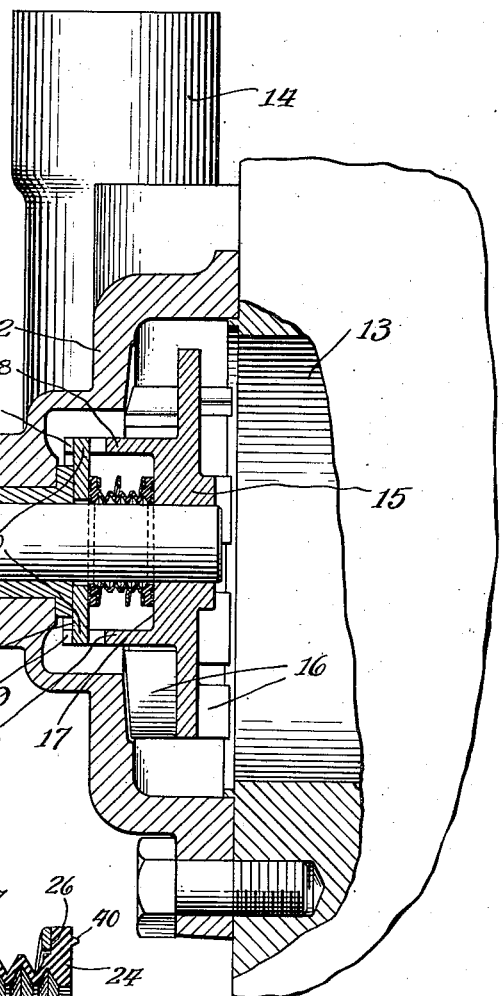
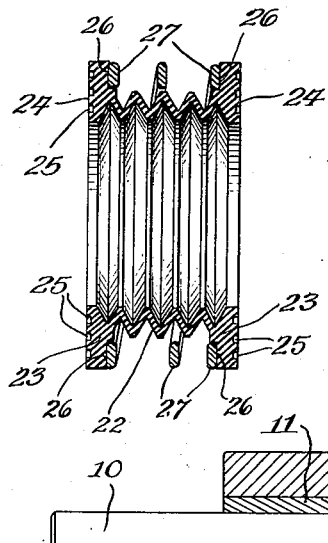
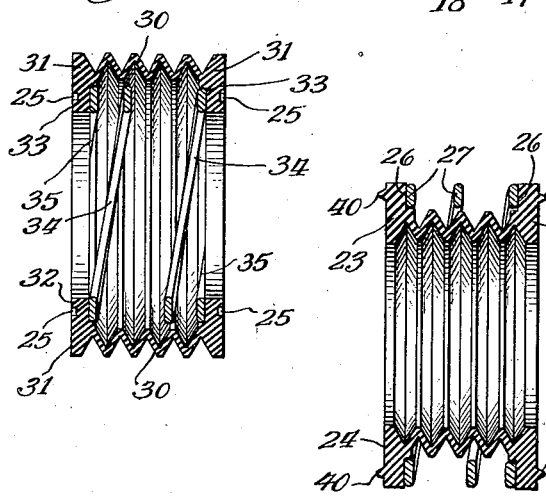
INVENTOR.
Olin Brummer
BY Kent W. Wonnell
Attorney.

Patented July 29, 1941

2,251,219

UNITED STATES PATENT OFFICE 2,251,219

FLUID SEAL

Olin Brummer, Oak Park, Ill., assignor to Crane Packing Company, Chicago, Ill., a corporation of Illinois Application March 8, 1941, Serial No. 382,354

1 Claim. (Cl. 288—2)

This invention relates in general to a fluid seal and is more particularly described as a seal for the water pump of an internal combustion engine adapted to prevent leakage from the fluid chamber between the drive shaft and the bearing.

An important object of the invention is in the provision of a flexible seal formed of rubber or a suitable rubber substitute which has opposite parallel sealing surfaces and an intermediate resilient bellows-like portion to permit relative longitudinal movement or end play between the sealing surfaces at the ends without disrupting the contact of the sealing surfaces.

A further object of the invention is in the provision of a resilient bellows-like sealing member having end portions with parallel sealing surfaces and inner flanges adapted to receive an extensible spring which tends to extend a bellows portion of the seal and to maintain the sealing surfaces in fluid tight engagement at the ends thereof.

A still further object of the invention is in the provision of a flexible bellows-like seal with an extensible spring seated within flanges thereof, and the unit thus provided is adapted to be readily incorporated as a part of the pump structure now in use without varying the form or construction of the mechanical elements to which it is applied, and permitting ready removal for purposes of repair and replacement.

Other and further objects of the invention will appear in the specification and will be apparent from the accompanying drawing in which, Fig. 1 is a sectional view illustrating a shaft seal in accordance with this invention as applied to the impeller of a rotary pump;

Fig. 2 is an enlarged sectional view of a sealing member as shown in Fig. 1 in an expanded position;

Fig. 3 is a similar sectional view of a modified form in which the spring is located inside of the seal; and Fig. 4 is a sectional view of a seal having sealing ribs in the faces of the sealing member opposite the extensible spring thereof.

This seal, although adapted to make a fluid tight connection for a shaft and for the bearing of a shaft, does not depend upon a fluid tight connection of the seal itself with the shaft. It depends rather upon the end engagement of parallel sealing surfaces with a fluid tight frictional engaging washer or disk, and the inner surfaces of a recess or cup formed in the hub of a pump impeller so that a substantially parallel relation is always maintained between the end contact surfaces of the seal which is assisted or augmented by the application of an expansible spring, at the same time permitting the necessary and sufficient longitudinal expansion between the ends of the sealing member to permit the usual and necessary end play of the pump shaft. The sealing member has extended bellows-like or accordion folds which together with the expansible spring are partially compressed when the sealing member is installed, and this will permit a further relative extension and contraction of the sealing folds between the ends of the seal without contact of the folds or the ends thereof with the shaft itself.

Referring now more particularly to the drawing, an ordinary type of water pump is shown in Fig. 1 having an impeller shaft 10 rotatable in a bearing sleeve 11 mounted in a pump casing 12 which has a central inlet 13 and a peripheral discharge outlet 14.

An impeller 15 is attached to and makes a fluid tight connection with the pump shaft to which it is rigidly secured. At the periphery are vanes 16, and a recess 17 surrounds the shaft at the inner side having a projecting flange 18 with opposite notches 19 for seating corresponding projections 20 of a sealing disk 21 to rotate it with the impeller. This sealing disk makes a fluid tight frictional engagement with the end of the housing or the end of the bearing 11 and fits freely upon the shaft to have no contact therewith.

Seated between the outer surface of the disk 21 and the inner or bottom surface 17 of the recess is a sealing member which is formed of flexible resilient material such as rubber, Neoprene, or any other suitable elastic material which does not readily deteriorate or lose its sealing and elastic properties due to heat, cold, continued expansion and contraction, or engagement with the material with which it comes in contact. This member as shown in Fig. 2 comprises a sleeve with a plurality of angularly extended folds 22, and thicker flanged contacting end portions 23. The outer contact faces 24 are substantially parallel and may be provided with a number of concentric sealing grooves 25.

In the form shown by Fig. 2, there is an outer shoulder 26 at the inside of each flange or end portion for seating a spring 27.

In the form shown by Fig. 3, the bellows portion 30 is at the outside with end portions 31 each having an inner flange 32 and an inside shoulder 33 for seating an expansible spring 34.

In the form shown by Fig. 4, which is similar to that shown by Fig. 2, each of the contact faces 24 is provided with an outwardly projecting and preferably rounded rib 40 which is located directly opposite the shoulder 26 of the flange and centrally with respect to the contact of the spring 27 therewith. Thus the spring presses firmly upon the rib and presses it yieldingly to make a fluid tight engagement with the parts which it contacts.

In all of these forms, the inside diameter of the sealing member, and of the spring 34 in the form shown by Fig. 3, is slightly larger than the shaft to which it is applied so that no part of the seal will bind or be held in engagement with the shaft, it being the object and intention in applying a seal of this type to avoid any binding contact or engagement with the shaft and to depend upon the fluid tight engagement of the ends of the seal caused by the resilience of the material of the seal itself and also by the application of the spring thereto.

The coil springs 27 and 34 are preferably made of flattened wire or bar stock in spiral form between the end portions which have angularly cut extremities 35, flattened to form end contact rings to engage all around the inner shoulders 26 or 33, thus insuring a uniform contact of the spring with the sealing member, the intermediate spiral portion having one or more spiral turns which provide the necessary resilience.

In applying any of the sealing members, they are slightly compressed between the disk 21 and the inside of the impeller recess so that both the bellows folds and the coil spring tend to hold the end portions against the surfaces which they are to seal. This insures a flexible sealing action at both ends of the sealing member within the limits of the intended movement of the seal. The internal diameter of the sealing member, its flanges, and the coil spring is greater than the shaft to which it is applied so that at no time will there be any frictional binding or contact with the shaft, thus insuring the sealing contact of the parallel end surfaces. In either form of the seal, that is, with the spring at the inside or at the outside of the bellows folds, the flattened coil spring flatly engages the shoulders of the flanges at one side and free from any contact or engagement with the bellows folds to avoid any wear, distortion or undue flexing of the bellows folds which might tend to reduce their usefulness.

While this seal is described in connection with a fluid pump, it may also be used in different sizes for sealing shafts and other members between which there is relative rotation.

I claim:

A fluid sealing unit comprising a rubber-like sleeve with bellows folds connecting integral thicker end pieces having outer parallel contact surfaces, and outwardly projecting flanges with inner shoulders outside of said folds, the inner diameter of the end pieces being not substantially less than the inner diameter of the folds, and a coil spring inserted between the shoulders and disposed outside of the folds and free from contact therewith.

OLIN BRUMMER.